United States Patent [19]

Itoh

[11] 3,868,818
[45] Mar. 4, 1975

[54] AUTOMOTIVE GAS TURBINE ENGINE
[75] Inventor: Takane Itoh, Yokohama, Japan
[73] Assignee: Nissan Motor Company Limited, Yokohama, Japan
[22] Filed: Feb. 28, 1973
[21] Appl. No.: 336,760

[30] Foreign Application Priority Data
Mar. 3, 1972 Japan .................... 47-22039

[52] U.S. Cl. .......... 60/39.15, 60/39.21, 60/39.16 S, 60/39.55
[51] Int. Cl. ........................ F02c 7/02, F02c 1/06
[58] Field of Search ......... 60/39.15, 39.21, 39.16 S, 60/39.22

[56] References Cited
UNITED STATES PATENTS

| | | | |
|---|---|---|---|
| 1,608,445 | 11/1926 | Trent | 60/39.15 |
| 2,580,591 | 1/1952 | Pouit | 60/39.21 |
| 2,651,911 | 9/1953 | Sterland | 60/39.15 |
| 2,750,738 | 6/1956 | Barrett et al. | 60/39.15 |
| 3,163,983 | 1/1965 | Donohue | 60/39.15 |
| 3,358,441 | 12/1967 | Gist | 60/39.15 |
| 3,585,795 | 6/1971 | Grieb | 60/39.15 |
| 3,621,654 | 11/1971 | Hull | 60/39.15 |
| 3,635,019 | 1/1972 | Kronogard et al. | 60/39.15 |
| 3,710,576 | 1/1973 | Evans et al. | 60/39.16 S |
| 3,722,213 | 3/1973 | Carter et al. | 60/39.16 S |

FOREIGN PATENTS OR APPLICATIONS

| | | | |
|---|---|---|---|
| 253,088 | 12/1948 | Switzerland | 60/39.15 |
| 1,198,873 | 6/1959 | France | 60/39.15 |

Primary Examiner—Carlton R. Croyle
Assistant Examiner—Warren Olsen
Attorney, Agent, or Firm—Robert E. Burns; Emmanuel J. Lobato; Bruce L. Adams

[57] ABSTRACT

An automotive gas turbine engine including first and second stage gas turbines of which the first stage gas turbine only is rendered operative when power demand is at low level whereas when power demand is at high level both the first and the second stage gas turbines are rendered operative to produce high power output. The first stage gas turbine includes an air compressor, a regenerator communicating with the air compressor and adapted to preheat air subsequently utilized, a combustor communicating with the regenerator to receive heated air therefrom, a gas generator turnine driven by high temperature gas from the combustor and a power turbine driven by the same. The second stage gas turbine includes a flow control valve communicating with the air compressor and adapted to control the amount of air flow passing therethrough, a combustor communicating with the flow control valve, and a power turbine communicating with the combustor of the second stage gas turbine adapted to be driven by a high temperature gas produced in he last-mentioned combustor, the flow control valve being opened to permit air flow from the air compressor into the combustor at the second stage gas turbine for generating high temperature gas therein when increased power is required from the engine.

1 Claim, 1 Drawing Figure

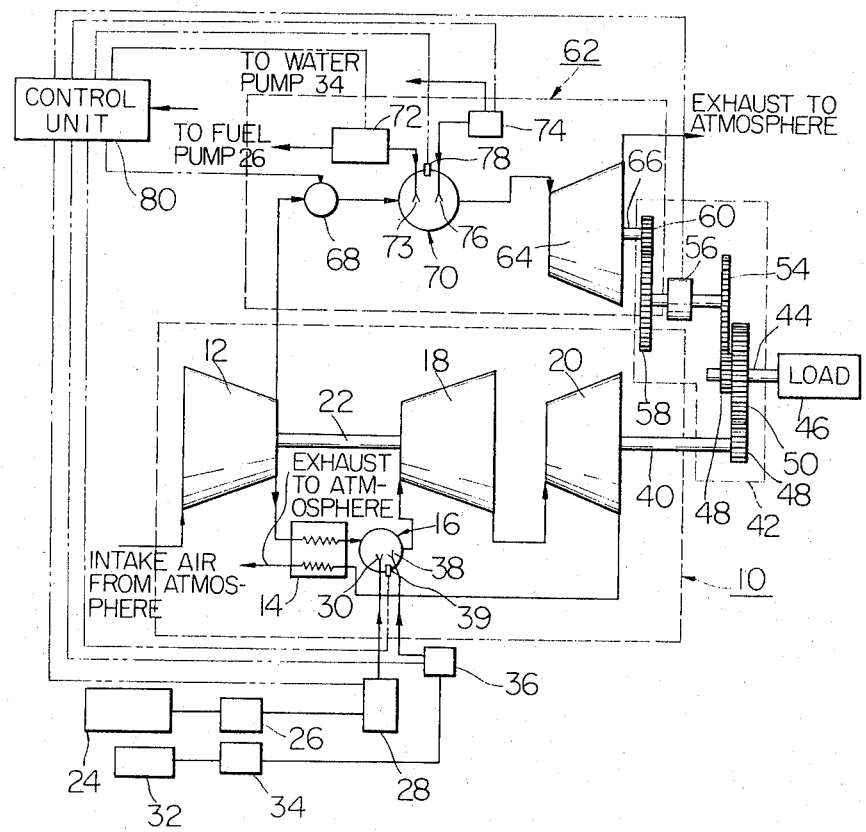

AUTOMOTIVE GAS TURBINE ENGINE

This invention relates in general to gas turbine engines and, more particularly, to a gas turbine engine specifically suited for use in a motor vehicle.

In the past, an automotive gas turbine engine has been operated at low load over wide ranges of driving conditions of a motor vehicle except highspeed driving and ascending conditions in which high power output corresponding to high load is required from the engine. When the gas turbine engine is operated at low load, the thermal efficiency of the engine is at a relatively low level, thus causing increased fuel consumption.

The present invention contemplates to eliminate the above-mentioned shortcomings encountered in the prior art and has an object to provide an improved gas turbine engine specifically suited for use in a motor vehicle.

According to one feature of the present invention, the gas turbine engine is constituted by first and second stage gas turbines, cooperating with each other. When the motor vehicle is driven at light or low load, only the first stage gas turbine engine is rendered operative in which the first stage gas turbine engine is operated at high thermal efficiency to produce high power output, that is, high for the first stage gas turbine. The second stage gas turbine engine is rendered operative to provide additional power when increased power is required from the engine.

According to another feature of the present invention, the gas turbine engine is provided with a single air compressor in for the first stage gas turbine, from which a portion of compressed air is supplied into the second stage gas turbine. This is advantageous especially when it is required to only intermittently drive the second stage gas turbine because the load is not sufficient for starting the second stage gas turbine.

According to a feature of the present invention, working gases required for driving the first and second stage gas turbines are maintained at a sufficient volume to cover a wide range of operations of the engine by injecting water into a combustor of the engine and vaporizing water into steam which compensates for the shortage of working gases for the first and second stage gas turbines. The operating temperature of the combustor is lowered to some extent due to water injection thereinto so that the contents of nitrogen oxide products can be reduced.

According to a still further feature of the present invention, the second stage gas turbine is maintained idle during light load driving condition of the motor vehicle and the second stage gas turbine is arranged to be driven by the motor vehicle during decelerating and descending conditions of the motor vehicle whereby engine braking action will take place.

These and other features and advantages of the present invention will become more apparent from the following description when taken in conjunction with the accompanying drawing in which a single FIGURE shows a preferred embodiment of the gas turbine engine according to the present invention.

It is to be understood that the present invention is not limited in its application to the details of construction and arrangement of parts illustrated in the accompanying drawing, since the present invention is capable of other embodiments and of being practiced or carried out in various ways. Also, it is to be noted that the phraseology or terminology employed herein is for the purpose of description and not of limitation.

Referring now to the single FIGURE of the drawing, there is schematically shown a preferred embodiment of the gas turbine engine implementing the present invention. The gas turbine engine proposed by the present invention is specifically suited for use in motor vehicles. The gas turbine engine comprises a first stage gas turbine which is generally designated by reference numeral 10. The first stage gas turbine 10 includes, as customary, an air compressor 12, a regenerator 14, a combustor 16, a gas generator turbine 18 and a power turbine 20.

The air compressor 12 is drivably connected to and driven by the gas generator turbine 18 through a shaft 22. This air compressor 12 delivers air under pressure to the combustor 16 through the regenerator 14, into which hot exhaust gases are introduced for preheating air passing into the combustor 16, as will be subsequently described.

The combustor 16 is supplied with fuel from a fuel tank 24, through a fuel pump 26, a fuel flow metering valve 28 and a fuel nozzle 30 opening to the combustor 16. The combustor 16 is also supplied with water from a water tank 32 through a water pump 34, a water flow metering valve 36 and a water nozzle 38. Indicated at 39 is an ignition plug which is controlled in a manner as will be described hereinafter in detail.

Fuel supplied into the combustor 16 is burned therein and the resulting combustion products flow first through the gas generator turbine 18 and then through the power turbine 20, from which they are exhausted through the regenerator 14 to the atmosphere as previously mentioned. The power turbine 20 is connected to a power shaft 40, which in turn is drivably connected through a gear unit 42 to an output shaft 44 coupled to any suitable load device which may, for example, be driving wheels of the motor vehicle (not shown).

The gear unit 42 is herein shown as comprising a first spur gear 48 mounted on the power shaft 40 and a second spur gear 50 mounted on the output shaft 44. The first and second spur gears 48 and 50 mesh with each other at all times and thus complete drive connection between the power and output shafts 40 and 44 for driving the load device 46. The gear unit 42 is shown as also comprising a third spur gear 52 mounted on the output shaft 44. The third spur gear 52 meshes with a fourth spur gear 54, which is selectively coupled to a fifth spur gear 58 through a clutch mechanism 56 interposed therebetween. The clutch mechanism 56 may be controlled in a manner as will be described in detail hereinafter so as to selectively couple the fifth spur gear 58 to the fourth spur gear 54. The fifth spur gear 58 meshes with a sixth spur gear 60 mounted on a power shaft 66 of a second stage gas turbine which is generally designated by reference numeral 62.

The second stage gas turbine 62 comprises a power turbine 64 and the power shaft 66 on which the sixth spur gear 60 meshing with the fifth spur gear 58 is mounted. The power turbine 64 cooperates with the air compressor 12. Compressed air from the compressor 12 is thus delivered through a flow control valve 68 to a combustor 70. The combustor 70 is also supplied with fuel from the fuel tank 24 through a fuel metering valve 72 connected to the fuel pump 26, and a fuel nozzle 73 opening to the combustor 70. The combustor 70 is further supplied with water from the water tank 32 through a water metering valve 74 connected to the water pump 34, and a water nozzle 76 opening to the combustor 70. Indicated at 78 is an ignition plug which is controlled in a manner as subsequently described in detail. A portion of compressed air from the air compressor 12 is delivered through the flow control valve 68, where the air flow is metered thereby, to the combustor 70. The combustor 70 is, as mentioned, supplied with fuel and air which are mixed and burned forming high temperature gas. This gas is fed to the power turbine 64 to drive the same.

The gas turbine engine may further comprise a control unit 80 for controlling the fuel metering valve 28, the water metering valve 36, the ignition plug 39, the clutch mechanism 56, the flow control valve 68, the fuel metering valve 72, the water metering valve 74 and the ignition plug 78. The control unit 80 may be arranged to produce a plurality of control signals in response to input signals X representative of, for example, the rotational speeds of the compressor 12 and the output shaft 44, the output torque of the output shaft 44 and the inlet temperature of the gas generator turbine 18. The control unit is well known in the art and, therefore, is not described in detail herein.

With the arrangement thus mentioned hereinabove, the second stage gas turbine engine 62 is maintained in its inoperative condition by closing the flow control valve 68 to prevent supply of compressed air into the combustor 70 and by disengaging the clutch mechanism 56 when the power demand is low. In this condition, the fuel valve 72 and the water metering valve 74 of the second stage gas turbine 62 are closed upon receiving appropriate control signals from the control unit 80, while the ignition plug 78 of the combustor 70 is also de-energized in response to a control signal delivered from the control unit 80. Thus, when the power demand is low, only the first stage gas turbine 10 is rendered operative so that the produced power is transmitted therefrom to the output shaft 44 through the gear unit 42. To this end, the control unit 80 delivers a control signal for operating the fuel metering valve 28 and a control signal for momentarily energizing the ignition plug 39 of the combustor 16 during starting of the engine so that combustion of fuel will begin in the combustor 16. In this condition, the water metering valve 36 is maintained in its closed condition due to a control signal delivered from the control unit 80. However, the water metering valve 36 may be slightly opened to supply water in a small amount into the combustor 16 with a view to reducing the amount of nitrogen oxide products in the combustor 16.

As the power demand increases to a predetermined level during, for example, acceleration of the motor vehicle, the control unit 80 delivers a control signal for opening the flow control valve 68 of the second stage gas turbine 62 so that the second stage gas turbine 62 also is rendered operative to increase the engine output. Under this circumstance, a portion of compressed air from the air compressor 12 is fed through the flow control valve 68 into the combustor 70 of the second stage gas turbine 62. It should be appreciated that the opening degree of the flow control valve is varied in dependence on the power demand by varying the magnitude of the control signal applied thereto accordingly. The quantity of compressed air delivered to the combustor 16 of the first stage gas turbine 10 is thus reduced by an amount delivered to the combustor 70 of the second stage gas turbine 62. The decrease in the amount of compressed air is compensated by supplying water through the water nozzle 36 into the combustor 16 of the first stage gas turbine 10 in an amount which converted into steam, approximates the decrease in the amount of compressed air delivered to the combustor 16. Consequently, the total quantity of gas passing through the gas generator turbine 18 and the power turbine 20 remains unchanged and, thus, the power output of the first stage gas turbine 10 is maintained at a constant level. On the other hand, compressed air passing through the flow control valve 68 enters the combustor 70 of the second stage gas turbine 62, where compressed air is mixed with fuel supplied through the fuel metering valve 72. Under this circumstance, the ignition plug 78 is momentarily energized in response to a control signal from the control unit 80 to start the second stage 62 and, accordingly, fuel mixture in the combustor 70 is burned. At the same time, the water metering valve 74 is opened in response to a control signal delivered from the control unit 80 so that water is injected into the combustor 70 in an amount which converted into steam depends on the power demand. Water is thus evaporated into high temperature steam which drives the power turbine 64 together with the combustion gases. In this condition, the clutch mechanism 56 is engaged in response to a control signal from the control unit 80 and, therefore, the power shaft 66 is coupled to the output shaft 44 through the gears 60, 58, 54 and 52. It will thus be seen that the total power output transmitted to the ouput shaft 44 is increased in this manner.

When engine braking action is required to take place such as during deceleration of the motor vehicle, the flow control valve 68 is closed to render the second stage gas turbine inoperative while the clutch mechanism is maintained in its engaged condition to couple the output shaft 44 to the power shaft 66 of the second stage gas turbine 62. This causes the output shaft 44 to drive the power shaft 66 of the second stage gas turbine 62 through the clutch mechanism 56 and thus engine braking action will take place. During this particular period, the flow control valve 68 may be preferably slightly opened to supply a small amount of compressed air through the combustor 70 into the power turbine 64 for thereby preventing a temperature rise therein. Alternatively, air can be introduced from the atmosphere instead of the air compressor 12. It should be noted in this instance, that the combustor 70 of the second stage gas turbine 62 is not supplied with fuel and water.

In the embodiment described hereinbefore, the combustor 70 of the second stage gas turbine 62 has been described as being not supplied with fuel and water when the second stage gas turbine 62 is maintained in its inoperative condition and the ignition plug has been described as being momentarily energized during starting of the engine only when the second stage gas turbine 62 is required to be rendered operative. However, a slight modification can be made in the above arrangement in which the flow control valve 68 and the fuel metering valve 72 are slightly opened and the ignition plug 78 is momentarily energized to continuously provide a pilot flame for ignition purposes when it is required for the second stage gas turbine 62 to be put in operation.

When the gas turbine engine thus arranged is in practical use, the amount of water required for operation of the engine and accordingly the capacity of the water tank 32 are determined in a manner as will be subsequently described. Before entering into detail discussion, it is assumed that the total power output of the turbines 18 and 20 is expressed as $L = L_1 + L_2$, where $L_1$ = power output of the turbine 18 and $L_2$ = power output of the turbine 20, and that the amount of air supplied into the first and second stage gas turbines is expressed as $G_a$. Now assuming that the power output of the second stage gas turbine 62 is $\Delta L$, then the amount $G_w$ of water flow is written as follows:

$$G_w = G_a \Delta L/L$$

From this, it is seen that the total amount $W$ of water required for a full range of engine operation is given as:

$$W = G_w \cdot \alpha T = G_a \Delta L/L \cdot \alpha T,$$

where $T$ represents the full range of engine operations and $\alpha$ represents an average time period in which the second stage gas turbine 62 is rendered operative to produce the power output $\Delta L$. The percentage of the average amount of water flow versus the amount of air flow is expressed as:

$$w = (W/T)/a = \Delta L/L \cdot \alpha = \Delta L/L_2 \cdot 1/1 + (L_1/L_2) \cdot \alpha$$

in which $L_1/L_2 \approx 1/2$ and $\alpha \lesssim 0.01$. Assuming that $L/L_2 = 1/2$, then the average amount of flow rate can be derived as $w = \alpha/3 = 0.0033 = (0.33 \text{ percent})$. From the above equation, it will be seen that the capacity of the water tank 32 is significantly smaller than that of the fuel tank 24.

It will now be understood from the foregoing description that the gas turbine engine of the present invention is adapted to operate at its higher performance efficiency level while reducing fuel consumption.

It will also be noted that the gas turbine engine of the present invention is simple in construction and easy to assemble.

What is claimed is:

1. A gas turbine engine for a motor driven vehicle comprising in combination, a first stage gas turbine including an air compressor, a combustor communicating with said air compressor and a source of fuel and generating working gases when said motor driven vehicle is running under light and heavy loads, a gas generator turbine communicating with said combustor and driven by said working gases delivered therefrom, a shaft connecting said gas generator turbine to said air compressor, a power turbine coaxial with said gas generator turbine, means providing communication between said power turbine and said gas generator turbine and said power turbine being driven by said working gases delivered therethrough, a regenerator disposed between said air compressor and said power turbine, means providing communication between said regenerator with an outlet side of said power turbine of said first stage gas turbine to receive working gases therefrom for preheating air for delivery to said combustor of said first stage gas turbine, a second stage gas turbine including a combustor communicating with said air compressor of said first stage gas turbine and said source of fuel, said last-mentioned combustor generating working gases when said motor driven vehicle is running under heavy load, and a power turbine rotatable about an axis parallel to that of said first stage turbine, the last-mentioned power turbine communicating with the last-mentioned combustor and driven by said last-mentioned working gases delivered therefrom, a flow control valve disposed between said air compressor of said first stage gas turbine and said last-mentioned combustor of said second stage gas turbine and providing communication therebetween when said motor driven vehicle is running under heavy load, a source of water, means for injecting water into said combustors of said first and second stage gas turbine when said motor driven vehicle is running under light and heavy loads, said water injecting means including respective water metering valves disposed between said source of water and said combustors of said first and second stage gas turbines for controlling the amount of water flow passing therethrough, first and second gear means connected to said power turbines of said first and second stage gas turbines, respectively, an output shaft connected to said first and second gear means, and a clutch mechanism disposed between said second gear means and said power turbine of said second stage gas turbine and providing a clutching and declutching drive connection between said output shaft and said power turbine of said second stage gas turbine.

* * * * *